United States Patent
Kear et al.

(10) Patent No.: US 6,395,214 B1
(45) Date of Patent: *May 28, 2002

(54) HIGH PRESSURE AND LOW TEMPERATURE SINTERING OF NANOPHASE CERAMIC POWDERS

(75) Inventors: Bernard H. Kear, Whitehouse Station, NJ (US); Shih-Chieh Liao, Chung-Li (TW); William E. Mayo, Edison, NJ (US)

(73) Assignee: Rutgers, The State University of New Jersey, New Brunswick, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,564

(22) Filed: Nov. 19, 1999

Related U.S. Application Data

(60) Provisional application No. 60/110,413, filed on Nov. 30, 1998.

(51) Int. Cl.[7] ............ H05B 6/00; B29C 67/00; C04B 33/32
(52) U.S. Cl. ............ 264/434; 264/125; 264/667
(58) Field of Search ............ 264/430, 434, 264/667, 125

(56) References Cited

U.S. PATENT DOCUMENTS

| | | | |
|---|---|---|---|
| 5,147,446 A | * 9/1992 | Pechenik et al. | 75/230 |
| 5,514,350 A | * 5/1996 | Kear et al. | 422/198 |
| 6,013,591 A | * 1/2000 | Ying et al. | 501/1 |
| 6,066,270 A | * 5/2000 | Eckert et al. | 252/521.1 |

* cited by examiner

Primary Examiner—Christopher A. Fiorilla
(74) Attorney, Agent, or Firm—Mathew, Collins, Shepherd & McKay, P.A.

(57) ABSTRACT

A hot pressing method involves the simultaneous application of high pressure (1.5–8 GPa) at a relatively low temperature (0.2–0.6 $T_m$) High compaction pressure causes particle deformation, such that the green density increases with pressure up to a maximum at about 8 GPa. Low sintering temperature mitigates grain growth during the consolidation process. Another factor that promotes densification is the occurrence of a pressure-induced phase transformation (typically from a metastable structure to a more stable structure), accompanied by a significant reduction in free volume for example greater than about 1 to about 2 vol. %. Such transformation-assisted consolidation has been successfully applied to produce sintered oxide and non-oxide bulk nanocrystalline ceramics having a grain size less than 100 nm, starting with even finer-scale ceramic nanopowders. Under appropriate high pressure conditions, a sintered grain size can be realized that is actually smaller than the original powder particle size.

12 Claims, 8 Drawing Sheets

HIGH PRESSURE AND LOW TEMPERATURE SINTERING OF NANOPHASE CERAMIC POWDERS

This application is based on provisional application No. 60/110,413 filed Nov. 30, 1998.

FIELD OF THE INVENTION

This invention relates to a method for manufacturing dense nanocrystalline ceramic articles, and in particular, to a hot pressing method that simultaneously uses high compaction pressures in the range of about 1.5–8 GPa and low sintering temperatures in the range of about 0.2–0.6 $T_m$ where $T_m$ is the absolute melting temperature to consolidate amorphous or nanocrystalline powder compacts into fully dense nanocrystalline ceramic articles.

BACKGROUND OF THE INVENTION

Methods have been developed for the production of nanostructured oxide and non-oxide ceramic powders. Nanopowders have been formed by rapid condensation of precursor species from the vapor state. However, processing these powders into bulk nanocrystalline forms has proven to be difficult, due to complications arising from the presence of high levels of chemisorbed species on the nanoparticle surfaces, as well as the occurrence of severe interparticle friction effects during powder compaction. Even if these difficulties are overcome, high temperature sintering of green state compacts often results in rapid grain growth, thus losing the opportunity to realize a bulk nanocrystalline structure. This effect can be mitigated to some extent by adding grain growth inhibitors, but usually at the expense of degrading mechanical and/or physical properties.

Various approaches to the consolidation of ceramic powders have been investigated, with varying degrees of success. Microwave-assisted sintering of nanopowder compacts of γ-$Al_2O_3$ is examined in J. Freim et al., "Microwave Sintering of Nanocrystalline γ-$Al_2O_3$", *Nanostructure Mater.*, 4, 371–385 (1994). It was observed that the occurrence of a phase transformation (γ-phase to α-phase) during sintering without an applied pressure resulted in rapid grain growth, which hindered further densification. Hot pressing of γ-$Al_2O_3$ and rapid sintering at 1125–1175° C. is examined in S. J. Wu et al., "Sintering of Nanophase γ-$Al_2O_3$ Powder", *J. Am. Ceram. Soc.*, 79, 2207–11 (1996) which described much reduced sintering rate at higher temperatures. At 1350° C., a relative density of 0.82 was realized. In another approach described in R. S. Mishra et al., "High-Pressure Sintering of Nanocrystalline γ-$Al_2O_3$", *J. Am. Ceram. Soc.*, 79, 2989–92 (1996), γ-$Al_2O_3$ was sintered at 650–1100° C. under high pressure (~1 GPa). The γ to α transformation temperature was reduced from 1200° C. at ambient pressure to about 750° C. at 1 GPa. Fully dense compacts with a grain size of about 142 nm were obtained at 1000–1100° C. and 1 GPa in 10 minutes. The transformation and densification of nanocrystalline θ-alumina during sintering forging is described in C. S. Nordahl et al., "Transformation and Densification of Nanocrystalline θ-Alumina during Sinter Forging", *J. Am. Ceram. Soc.*, 79, 3149–54 (1996). It was demonstrated that by using seeded nanocrystalline θ-alumina as the starting material, dense α–$Al_2O_3$ with a grain size of 230 nm could be obtained at 235 MPa/1060° C. for 30 minutes. The compaction and heat treatment behavior of nanocrystalline (~20 nm) γ-$Al_2O_3$ at high pressure is described in M. R. Gallas et al. "Fabrication of Transparent γ-$Al_2O_3$ form Nanosize Particles", *J. Am. Ceram. Soc.*, 77, 2107–12 (1994). Pressures up to 3 GPa and liquid nitrogen as a lubricant were utilized to form transparent green-state compacts, followed by pressure-less sintering at 800° C. for a few hours. Transmission Electron Microscope (TEM) examination of the sintered sample revealed a random dense-packed particle structure and interconnected porosity. Interstitial void dimensions, however, were always less than the average particle diameter.

Approaches described in S. C. Liao et al., "High Pressure and Low Temperature Sintering of Bulk Nanocrystalline $TiO_2$", *Materials Science and Engineering A*, 204, pp. 152–159 (1995); "Theory of High Pressure/Low Temperature Sintering of Bulk Nanocrystalline $TiO_2$", *Acta Materialia*, 45 [10], pp. 4027–4040 (1997); "Retention of Nanoscale Grain Size in Bulk Sintered Materials via a Pressure-Induced Phase Transformation", *Nanostructured Materials*, 8[6], pp. 645–656 (1997); and "The Effect of High Pressure on Phase Transformation of Nanocrystalline $TiO_2$ during Hot-Pressing", *Nanostructured Materials*, 5[3], pp. 319–325 (1995) found that bulk $TiO_2$ with nanoscale grain structure could be produced by high pressure/low temperature sintering of a metastable $TiO_2$ polymorph (anatase). The high pressure was described as not exceeding 1.5 GPa in these works and the low temperature was described in the range of 400–445° C. The combined high pressure and low temperature sintering was found to reduce the diffusion rate while increasing the nucleation rate of the stable phase (rutile). The net result was the production of nanocrystalline (~36 nm grain size) $TiO_2$ (rutile) with high density (>98%), high hardness (800 VHN, and about 6 times improvement in wear resistance. See Y. Iwai et al, "Tribological Properties of Nanocrystalline $TiO_2$", *Proceedings of JAST Tribology Conference*, Osaka, November, 1997, Japanese Society of Tribologists, Osaka, Japan, 1997, 1997, pp. 209–212.

It is desirable to provide nanocrystalline ceramics with improved hardness and wear resistance, combined with good fracture toughness, compared with their microcrystalline counterparts.

SUMMARY OF THE INVENTION

The present invention relates to a method for fabricating nanocrystalline ceramic articles in which a loosely agglomerated ceramic nanopowder is synthesized. For example, the nanopowder can be synthesized by chemical vapor condensation (CVC) using a hot-wall reactor for the production of non-oxide ceramics and a combustion-flame reactor for the production of oxide ceramic powders. The nanopowder is formed into a compact and consolidated at pressures of at least 1.5 GPa and temperatures of no greater than 0.6 times the absolute melting temperature of the ceramic nanopowder ($T_m$). For example, the nanopowder can be compacted at pressures in the range of 1.5–8 GPa and temperatures in the range of 0.2–0.6 $T_m$.

It has been found that high compaction pressure causes deformation, such that the green density increases with pressure up to a maximum at about 8 GPa. Low sintering temperature mitigates grain growth during consolidation. The simultaneous application of high pressure and low temperature to a nanocrystalline powder compact under near isostatic conditions produces a sintered nanophase ceramic article with high density and a grain size comparable with the original powder particle size. The article can be produced with superior properties and performance for specific applications. For example, higher strength and toughness is advantageous for components in combustion and gas turbine engines, higher hardness and wear resistance is advantageous for protective coatings, and enhanced optical transparency is advantageous for infra-red windows, aircraft canopies, and high intensity lamps.

In one aspect of the invention nanophase powder with a metastable structure can be used as a starting material. Under high pressure, the metastable phase transforms to a more stable phase, which effect promotes the consolidation process. This transformation-assisted consolidation has been successfully applied to produce sintered oxide and non-oxide bulk nanocrystalline ceramics having a grain size of less than 100 nm, starting with even finer-scale ceramic nanopowders in the range of 5 to 50 nms. Also, under appropriate conditions for example sintering pressures in the range of 3 GPa to 5.5 GPa, the grain size of the nanocrystalline sintered product can be smaller than the original nanopowder particle size. These effects have not previously been reported, since prior work on sintering of ceramic powder compacts has been limited to pressures less than 1.5 GPa.

Although the method of the present invention is especially useful for processing nanophase $Al_2O_3$, $TiO_2$, $Y_2O_3$ and $Si_3N_4$, other types of oxide and non-oxide ceramics, such as YSZ, $BaTiO_3$, YBCO, AlN, SiC and their composites, can also be processed using the method of the present invention. It is typically advantageous to utilize high quality ceramic nanopowders produced by vapor condensation methods as starting materials, because of their high purity, low degree of agglomeration, and extraordinary susceptibility to sintering. The latter is simply a reflection of the high driving force for sintering due to the high surface area of the nanoparticle compacts. It has been found that the exceptionally fine grain sizes of the nanocrystalline ceramics formed by the method of the present invention give improvements in properties and performance that are unattainable with conventional microcrystalline ceramics. Accordingly, a preferred embodiment of the present invention is a dense nanocrystalline ceramic material that has a completely uniform grain size of less than 100 nm in the fully sintered state.

In one embodiment, a near-net shape forming of the ceramic article can be accomplished by using a soft mold technique, wherein the shaped compact is subjected to a uniform isostatic pressure by surrounding it with a pressure transmitting medium, such as boron nitride powder. By limiting the exposure time at the sintering temperature, using a grain growth inhibitor, or exploiting a phase transformation during sintering, the initial nanophase structure can be substantially retained, or even reduced, during the consolidation step in the process, thereby ensuring superior properties in the finished article.

BRIEF DESCRIPTION OF THE DRAWINGS

The advantages, nature and various additional features of the invention will appear more fully upon consideration of the illustrative embodiments described in detail below, considered together with the accompanying drawings. In the drawings.

DETAILED DESCRIPTION OF THE INVENTION

The method of the present invention demonstrates that high pressure/low temperature (HPLT) sintering of powder compacts is a viable powder consolidation technology, capable of producing high density bulk nanocrystalline ceramic materials. In the method of the present invention, the use of higher compaction pressures in the range of about 1.5 GPa to about 8 GPa is examined. It has been found that, under the influence of these exceptionally high pressures, a sintered ceramic body with nanoscale grain size can be produced. Preferably precautions are taken to clean the surfaces of the powder particles before sintering. It has also been discovered that the high initial green densities are achievable in nanophase ceramics at ambient temperature and at pressures of at least about 1.5 GPa. This effect also occurs at higher temperatures, but is accompanied by sintering of the powder compacts. In addition, it has been shown that a sintered grain size can be realized that is actually smaller than the original powder particle size. In contrast, in the absence of such pressure-influenced nucleation and growth processes, the grain size increases rapidly during sintering to produce a disadvantageous micro-grained bulk material, as observed by many other workers in the field.

Figure 1:
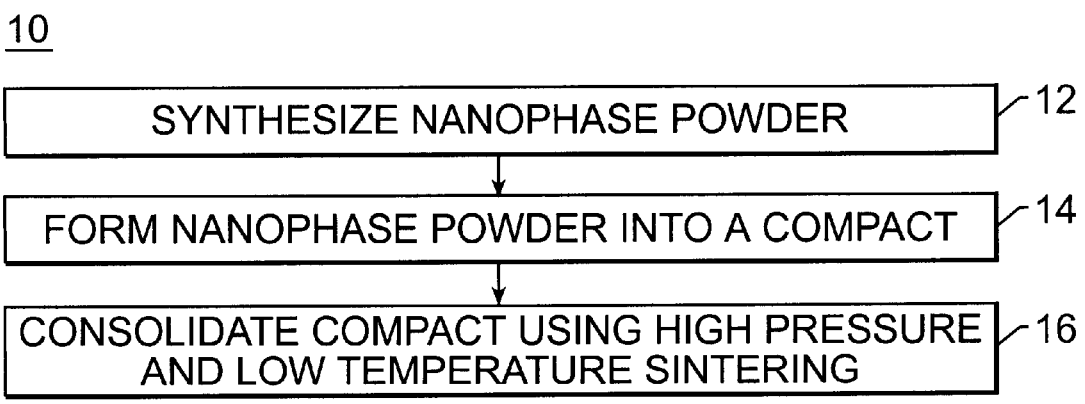
FIG. 1 is a flow diagram of a method for fabricating a nanocrystalline ceramic article in accordance with the teachings of the present invention.

FIG. 1 illustrates a flow diagram of a method for fabricating a nanocrystalline ceramic article 10 in accordance with the teachings of the present invention. For illustrative purposes only, the method of the present invention will be described as it pertains to the synthesis and consolidation of nano-$Al_2O_3$ powder. It should be understood, however, that the method of the present invention can be used for synthesizing and consolidating nanophase $TiO_2$, $Y_2O_3$, $Si_3N_4$ and other types of oxide and non-oxide ceramics such as YSZ, $BaTiO_3$, YBCO, AlN or SiC and their composites.

In block 12, a ceramic nanopowder is synthesized. Nanophase $Al_2O_3$ powder can be synthesized using conventional combustion flame-chemical vapor condensation (CF-CVC) methods. In this method, a flat-flame combustor, operating at low dynamic pressure in the range of 1–20 mbar, is used as the heat source. The fuel is a mixture of acetylene or hydrogen and oxygen. Powder synthesis is accomplished by passing a metalorganic precursor such as an aluminum precursor compound, for example aluminum sec-butoxide, through the combustion flame where it rapidly decomposes and reacts, forming a beam of very hot nanoparticles emerging from the flame which are collected on a water-cooled copper chill. Typically, the resulting nano-$Al_2O_3$ powder is loosely agglomerated and consists of 100% cubic γ-phase, with an average grain size that is controllable over the range of about 5 to about 30 nm as determined by X-ray diffraction (XRD). Since the temperature profile and gas phase residence time are uniform across the entire burner surface, the powder has a narrow particle size distribution.

Figure 2:
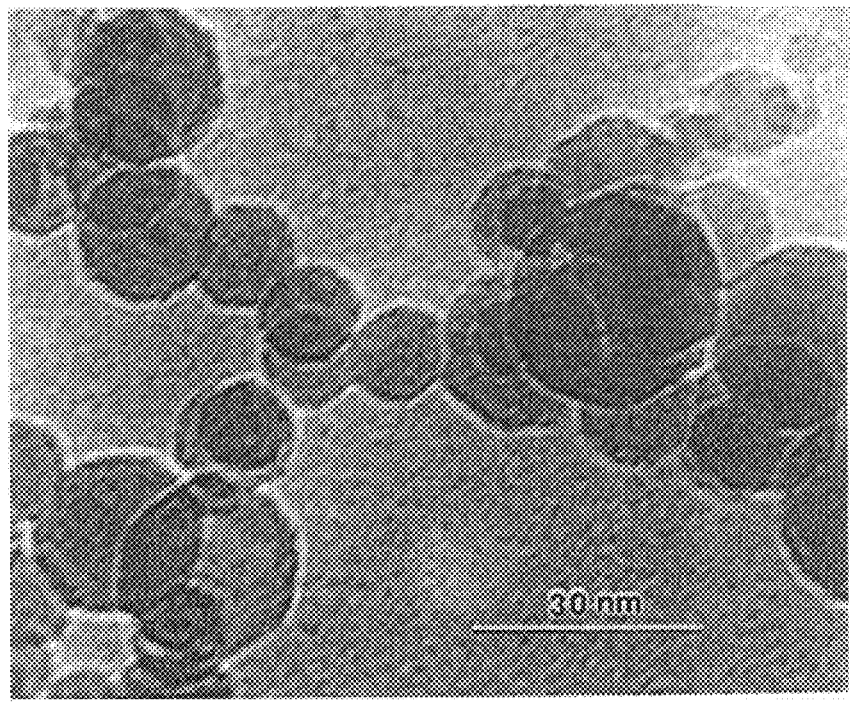
FIG. 2 shows a transmission electron microscope (TEM) micrograph of a typical nano-$Al_2O_3$ starting powder made by a combustion flame method.

FIG. 2 shows a transmission electron microscope (TEM) micrograph of a typical nano-$Al_2O_3$ starting powder made by the combustion flame method. The powder has a 100% γ-phase with an average grain size of 18 nm as determined by X-ray diffraction.

It will be appreciated that the combustion flame reaction can be used for synthesizing other types of oxide ceramic powders, which was described above. In an alternative embodiment, a non-oxide ceramic nanopowder is synthesized in a CVC process by a hot-wall reactor, a suitable hot wall reactor is manufactured by, Nanopowder Enterprises. Other chemical and physical synthesis processes can be used in block 12 for forming loosely-agglomerated oxide and non-oxide ceramic nanopowders. Suitable synthesis processes include laser pyrolysis, inert gas condensation and plasma arc synthesis.

After synthesis of the oxide nanopowder, the oxide nanopowder can be heated to eliminate chemisorbed surface species and to complete any incompleted precursor decomposition. Due to its high surface area, nano-$Al_2O_3$ powder absorbs chemical species, particularly moisture, from the ambient air environment. Thus, consolidation of nano-$Al_2O_3$ powder is complicated by the presence of high levels of chemisorbed gases. To minimize this problem, the powder compacts are heat treated and then stored in dry nitrogen. When needed, the powder compacts are expeditiously transferred to the high pressure cell for processing, thereby minimizing the extent of impurity pick-up. Occasionally, incomplete pyrolysis of the precursor in the combustion zone can occur. The heat treatment also serves to complete pyrolysis of the precursor in the combustion zone without inducing nanoparticle coarsening.

For example, $Al_2O_3$ ceramic nanopowder can be heated in a vacuum at less than about 0.3 times the melting temperature of the nano-$Al_2O_3$. Similarly, after synthesis of a non-oxide ceramic nanopowder such as $NH_3$, the nano-$Si_3N_4$ can be heated in a reactive gas stream of $NH_3$ at less than about 0.3 times the melting temperature of the nano-$Si_3N_4$ to eliminate chemisorbed surface species and to complete any incompleted precursor decomposition.

In block 14, the ceramic nanopowder is formed into a compact. For example, the nanopowder can be cold pressed uniaxially at room temperature under a modest pressure of about 500 MPa. Thereafter, the green density compact is preferably wrapped in Ta or Mo foil to prevent any contact with an apparatus used for performing consolidation.

In block 16, the ceramic nanopowder compact is consolidated with high pressure and low temperature (HPLT). Suitable apparatus for performing consolidation include toroidal presses, belt presses, tetrahedral presses, and piston and anvil presses. The press preferably applies near-isostatic pressure to a practical working volume greater than 5 $mm^3$. Preferably, the consolidation is performed under a pressure of at least about 1.5 GPa and a temperature no greater than about 0.6 times the melting temperature of the ceramic powder.

Figure 3A:
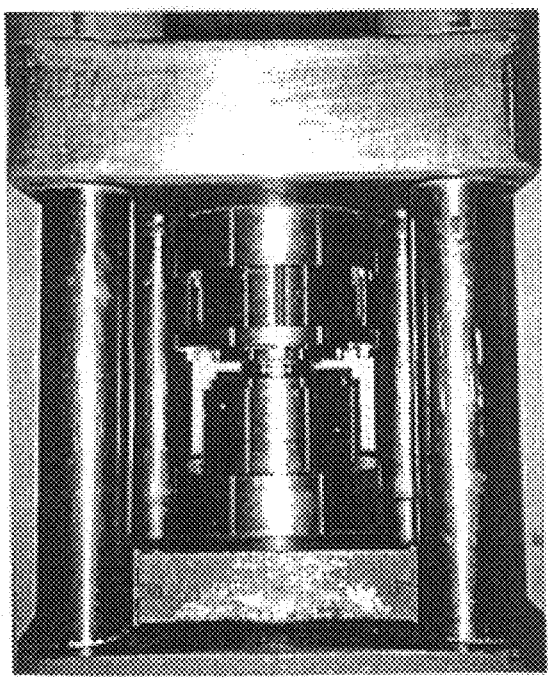
FIG. 3A is an elevational view of a toroidal-type high pressure apparatus.
Figure 3B:
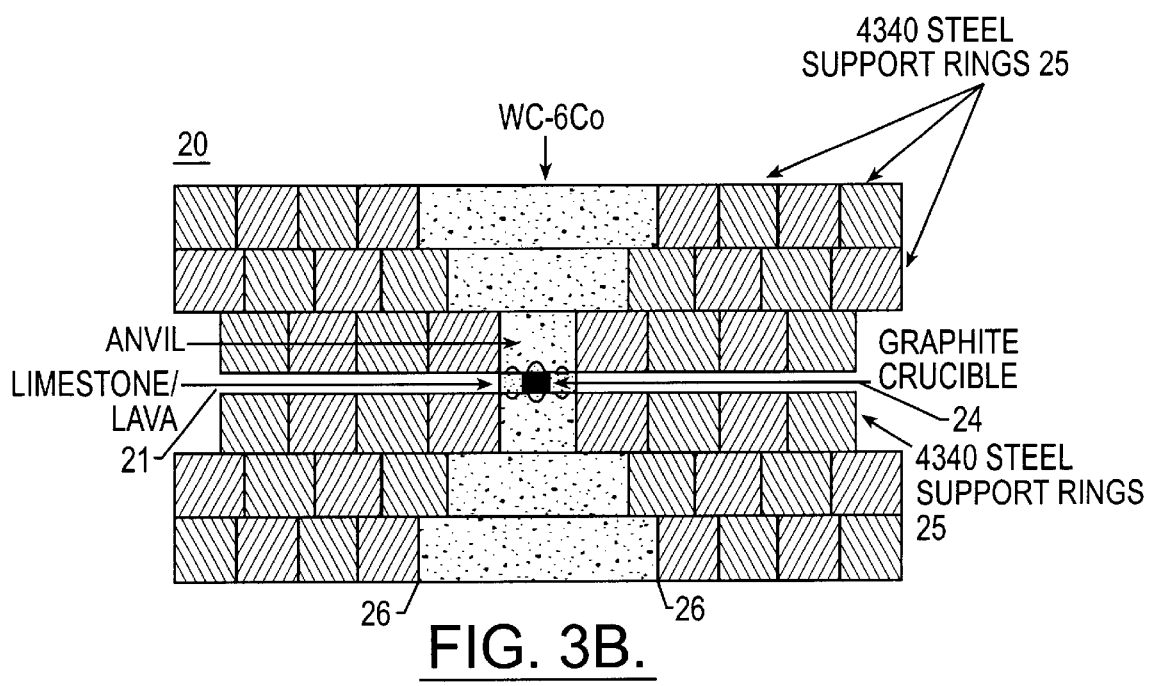
FIG. 3B is a schematic sectional view of the apparatus of FIG. 3A.

FIGS. 3A and 3B show a HPLT apparatus for performing consolidation 20 which is a toroidal-type high pressure apparatus as described by O. A. Voronov, "Diamond Ceramics Produced at High Pressure", *Science Applications International Corporation*, McLean, Va., 1995. Apparatus 20 is capable of attaining pressures up to 8 GPa and temperatures up to 2000° C. Pressure calibration can be carried out using pure lead selenide, bismuth and barium as standards, since their electrical resistivities change at well-known transition pressures. Temperature can be measured with a thermocouple not shown. A reaction cell 21 is formed of a limestone or lavastone Reaction cell 21 serves as an insulator and pressure transmitting medium. Crucible 24 is used for holding the compact. For example, crucible 24 can be formed of graphite. Crucible 24 is placed in reaction cell 21. Supporting rings 25 form apparatus 20. Reaction cell 21 is placed between anvils 26 of a HPLT apparatus 20, and subjected to pressures of about 1.5 to about 8 GPa at temperatures of about 400° C. to about 800° C., which is about 0.2 to about 0.6 times the melting temperature of the ceramic nanopowder for about 15 or about 30 minutes. Typically, it takes about 30 seconds to reach the sintering temperature. Sintered compacts formed with apparatus 20 were about 4 mm dia.×4 mm tall.

The consolidating step of block 16 can be performed with a soft mold technique in which the formed compact of block 14 is subjected to uniform isostatic pressure by surrounding the compact with a pressure transmitting medium. A suitable pressure transmitting medium is a boron nitride powder.

Block 12 can form a ceramic nanopowder of a metastable structure. During the consolidation performed in block 16, the metastable phase transforms to a stable structure with a smaller specific volume, for example, having a reduction of greater than about 1 to about 2 volume percent. Alternatively, block 12 can form a ceramic nanopowder of an amorphous or crystalline structure. A significant reduction in free volume occurs during consolidation in block 16 when a stable phase of the nanopowder is formed from a metastable phase of the nanopowder.

Figure 4:
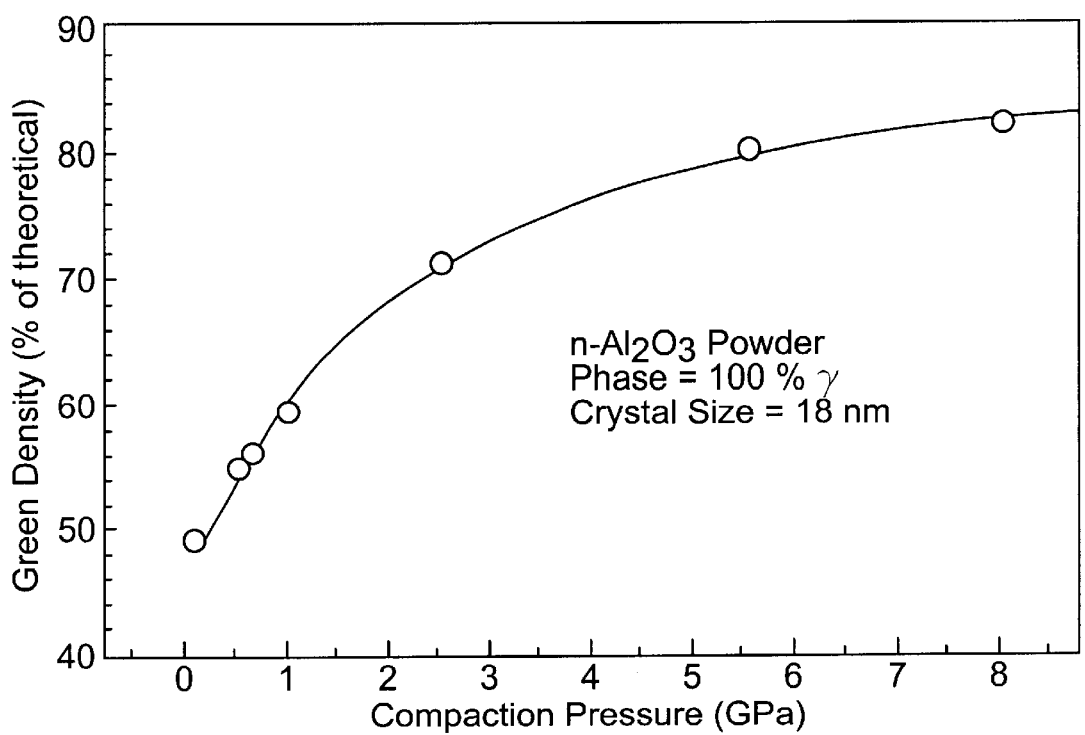
FIG. 4 shows a plot of the green density of nano-$Al_2O_3$ compacts as a function of compaction pressure.

FIGS. 4–11 illustrate characteristics of $Al_2O_3$ compacts produced by the method of the present invention and comparisons with conventional methods. FIG. 4 shows a plot of the green density of nano-$Al_2O_3$ compacts vs. applied pressure. The density increases from about 0.55 at a compaction pressure of 0.5 GPa, as shown by point P, to about 0.83 of theoretical at compaction pressure of about 8 GPa. According to a theoretical analysis of dense random packing of monosized spheres as described in "A Theoretical Analysis of Random Packing Densities of Mono-sized Spheres in Two and Three Dimensions" by R. K. Bordia, *Scripta Metall.*, 18, 725 (1984), the upper limit on the packing factor is about 0.64. In comparison, the packing factor for ideal close packed spheres is 0.74. However, the actual packing density depends on powder characteristics; namely, particle size distribution, morphology, and other factors including the adsorbed moisture. For non-monosized particles, the packing density also changes with the particle size ratio, and the corresponding weight % of different-sized particles. It is believed that the unusually high green densities achieved by the present invention. For example, 0.80 at a compaction pressure of 5.5 GPa; 0.83 at a compaction pressure of 8 GPa of nano-$Al_2O_3$ compacts, may be attributed partly to plastic deformation of the nanoparticles during compaction at high pressure. It is believed that the average pressure at the particle contact points is even higher due to the presence of pores, which can be corrected by a factor g, where g is the stress multiplication factor. The factor g is a function of the porosity, see R. L. Coble, "Diffuision Models for Hot Pressing with Surface Energy and Pressure Effects As Driving Forces", *J. Appl. Phys.*, 41[12], 4798 (1970), and the shape of the pores, see J. M. Vieira, "Kinetics of Hot-Pressing: The Semilogarithmic law", *J. Am. Ceram. Soc.*, 67, 245 (1984), and is in the range 1 to 3 for relative density between 0.6 and 1.0, see R. L. Coble. K. D. P. Lagerlof et al. "Slip and Twinning in Sapphire ($\alpha$-$Al_2O_3$)", *J. Am. Ceram. Soc.*, 77, 385–97 (1994), which studied slip and twinning in sapphire ($\alpha$-$Al_2O_3$) and found that the prismatic slip system was activated at pressures above about 3.5 GPa at room temperature. Accordingly, plastic deformation of particles may be present in compaction at very high isostatic pressure. In addition, it is suspected that there may be chemical species, such as chemisorbed OH, which promote the packing of particles.

Figure 5A:
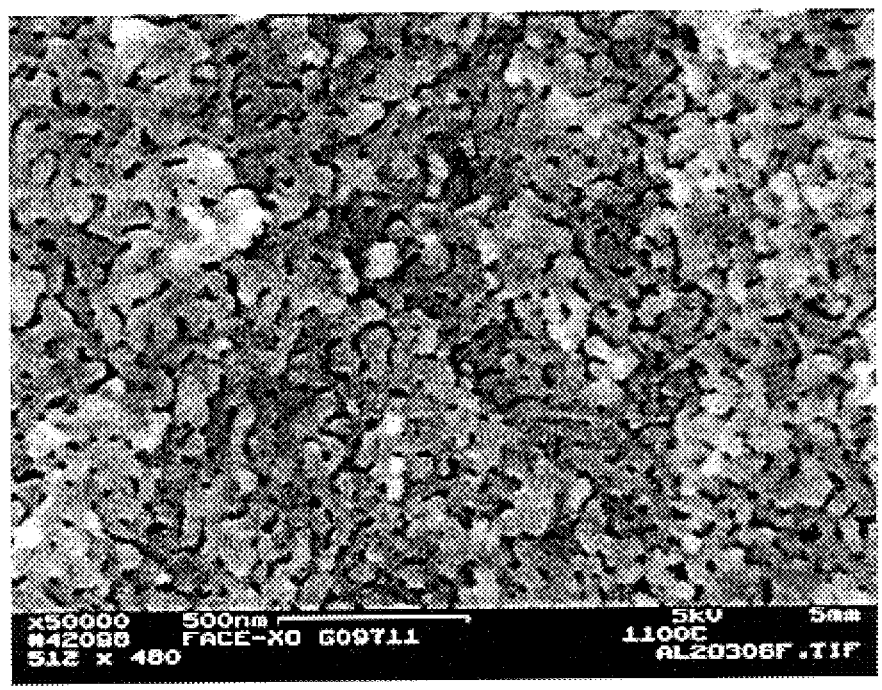
FIG. 5A is a field emission scanning electron microscope (FESEM) micrograph of $\gamma$-$Al_2O_3$ powder cold pressed at 500 MPa and sintered at 1100° C. under ambient pressure for 15 minutes.
Figure 5B:
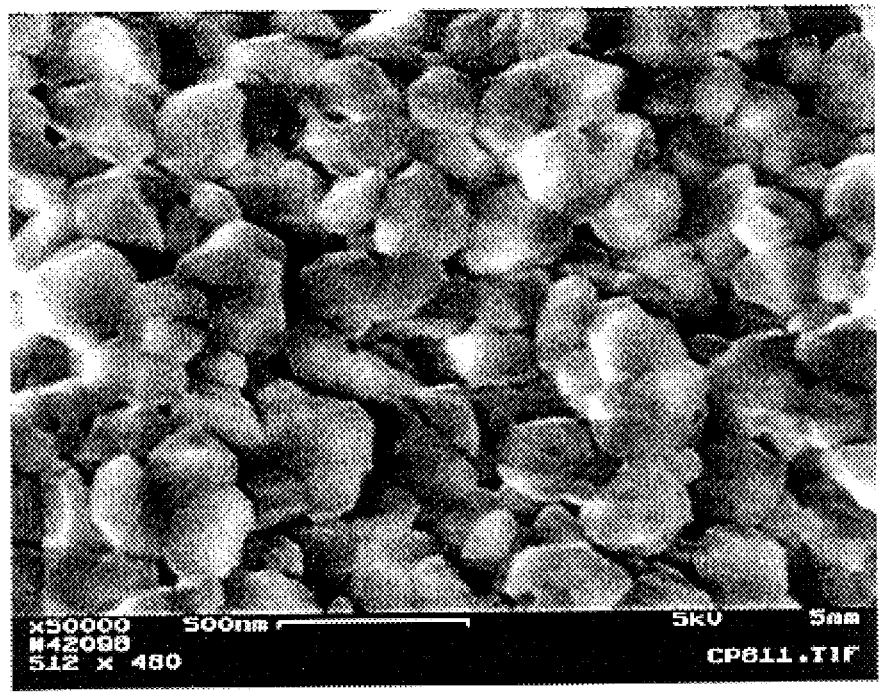
FIG. 5B is a field emission scanning electron microscope (FESEM) micrograph of $\gamma$-$Al_2O_3$ powder cold pressed at 8 GPa and sintered at 1100° C. under ambient pressure for 15 minutes.

In the absence of an applied pressure, nanocrystalline $\gamma$-phase alumina transforms to $\alpha$-phase at about 1100–1200° C. as described by Freim et al. "Microwave Sintering of Nanocrystalline $\gamma$-$Al_2O_3$", *Nanostructure Mater.*, 4, 371–385 (1994). and Mishra et al. "High-Pressure Sintering of Nanocrystalline $\gamma$-$A_2O_3$", *J. Am. Ceram. Soc.*, 79, 2989–92 (1996). Such a transformation results in the formation of a so-called vermicular (porous) structure, discussed in Wu et al., "Sintering of Nanophase $\gamma$-$Al_2O_3$ Powder", *J. Am. Ceram. Soc.*, 79, 2207–11 (1996), which requires sintering at a temperature >1600° C. to obtain high density. FIG. 5A shows the resulting vermicular $\alpha$-$Al_2O_3$ structure when $\gamma$-$Al_2O_3$ powder is cold pressed at conventional conditions of 500 MPa and sintered at 1100° C. under ambient pressure for 15 minutes. The same sintering treatment after cold-pressing at 8 GPa gives a faceted grain structure as shown in FIG. 5B. The higher green density of the 8 GPa cold pressed sample promotes grain growth during sintering, apparently because of the much reduced porosity.

Figure 6:
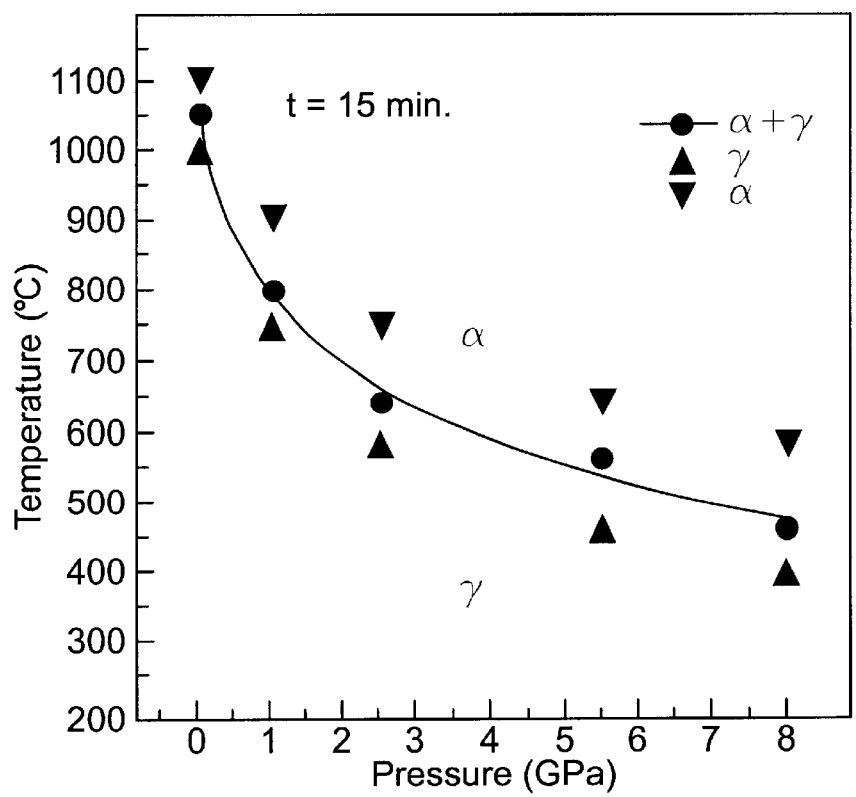
FIG. 6 is a pressure-temperature phase diagram of $\alpha$ and $\gamma$ phases of nano-alumina for a sintering (transformation) time of about 15 minutes.
Figure 7:
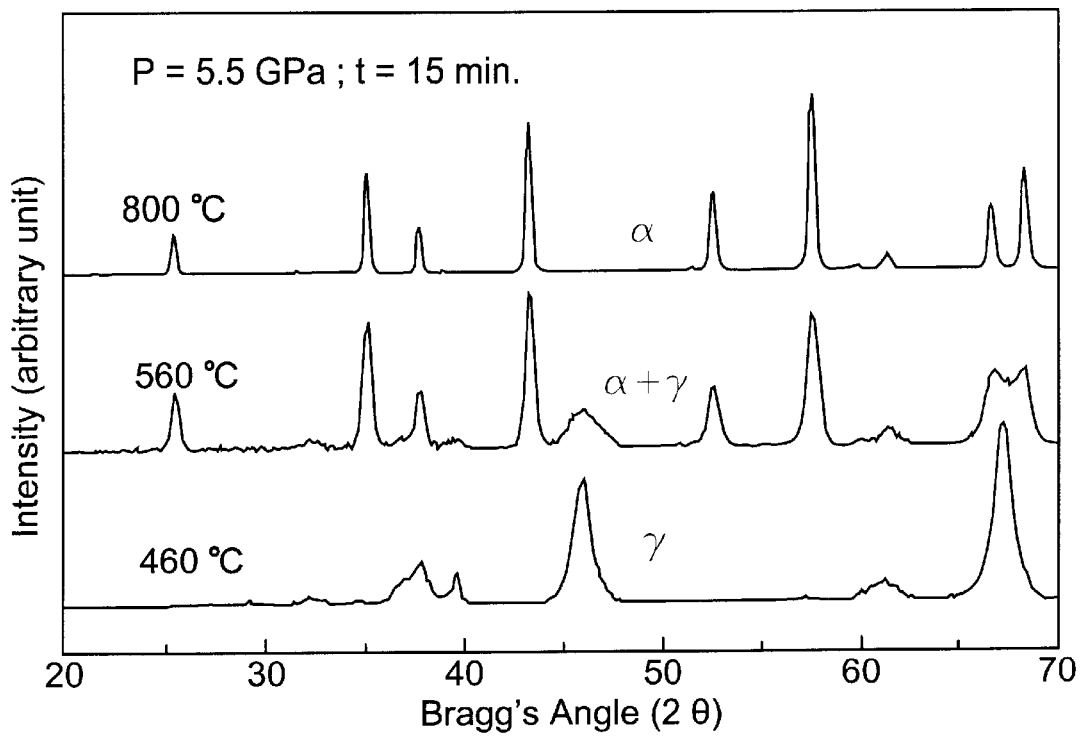
FIG. 7 is an X-ray diffraction profile of nano-alumina samples sintered at 5.5 GPa and various temperatures for 15 minutes.

FIG. 6 shows that the starting temperature for the $\gamma$ to $\alpha$ transformation decreases from about 1075° C. at ambient pressure to about 460° C. at 8 GPa. Moreover, at each pressure, there is a gradual transformation from the metastable $\gamma$-phase to the stable $\alpha$-phase, which is indicative of a nucleation and growth process. The sintering (transformations) time was about 15 minute. This is confirmed by the broadening of the XRD peaks (indicative of smaller grain size) of the $\gamma$-phase at 560° C. as shown in FIG. 7, which may be attributed to the gradual consumption of the parent $\gamma$-phase by the nucleated $\alpha$-phase. The sample sintered at 560° C. in FIG. 6 consisted of about 55 wt. % $\alpha$ phase and about 45 wt. % $\gamma$ phase. The $\alpha$ grain sizes of samples sintered at about 560° C. and about 800° C. are 63 and 73 nm respectively.

Figure 8A:
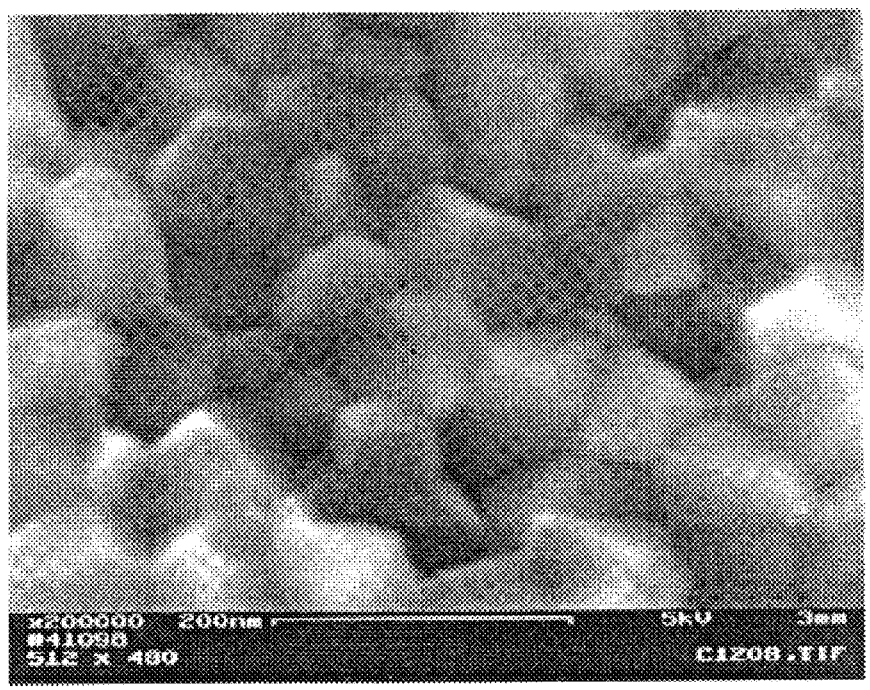
FIG. 8A is a FESEM micrograph of $\gamma$-$Al_2O_3$ sintered at 5.5 GPa and 800° C. for 15 minutes.
Figure 8B:
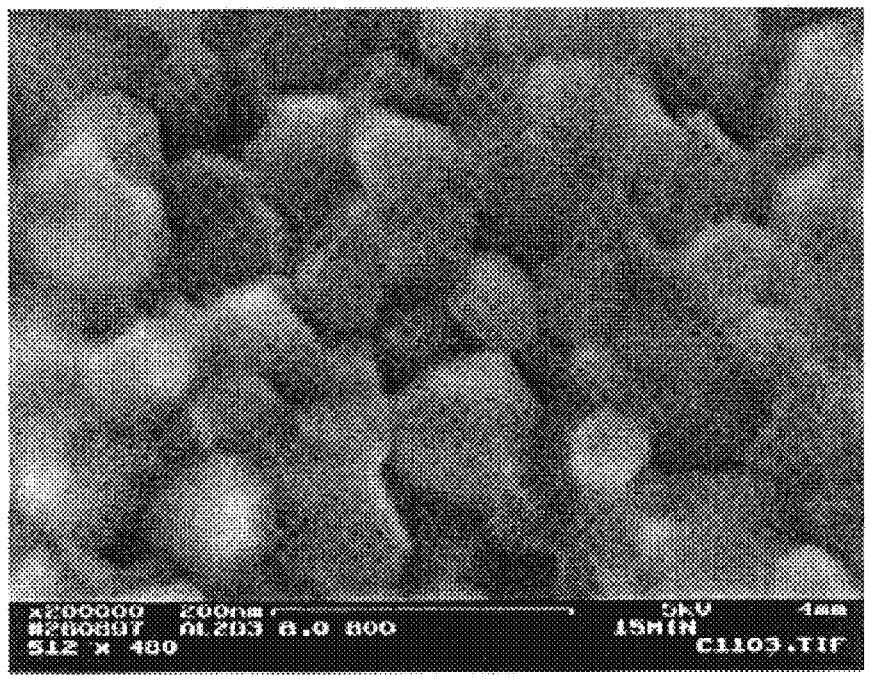
FIG. 8B is a FESEM micrograph of $\gamma$-$Al_2O_3$ sintered at 8 GPa and 800° C. for 15 minutes.

FIG. 8A shows that sintering of $\gamma$-$Al_2O_3$ at 5.5 GPa and 800° C. for 15 minutes results in a compact with density of about 3.79 g/cm$^3$ (about 95.0% dense $\alpha$-phase) and a grain size of about 73 nm as determined by XRD. When the pressure is increased to 8 GPa at 800° C. for 15 minutes, the density increases to about 3.92 g/cm$^3$ (about 98.2% dense $\alpha$-phase) and the grain size decreases to about 49 nm as determined by XRD, as shown in FIG. 8B. The decrease in sintered $\alpha$-phase grain size is a consequence of increased nucleation rate and decreased growth rate of the transformed $\alpha$-phase with increasing pressure.

Figure 9:
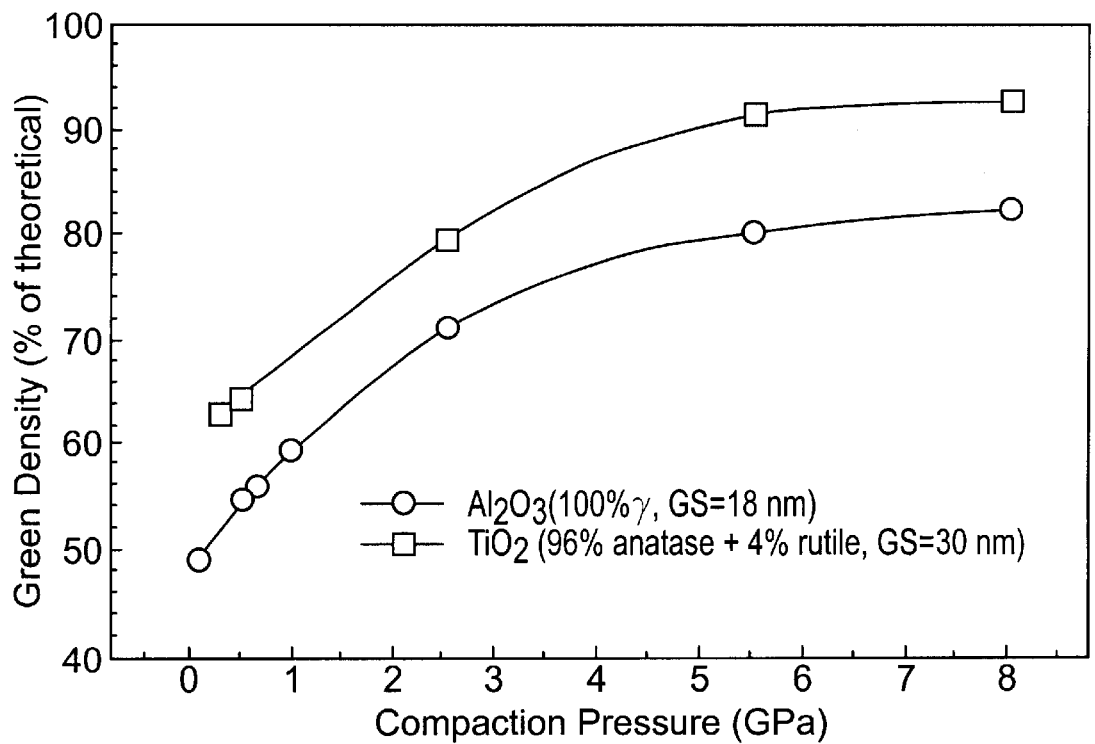
FIG. 9 is a graphical depiction of the green density of nano-$TiO_2$ and nano-$Al_2O_3$ as a function of compaction pressure.

Hot pressing of different types of nanophase oxide and non-oxide ceramic powder compacts have shown patterns of behavior that are consistent with the results described above. It has been observed that the green density of nanopowder compacts increases with pressure up to a maximum at about 8 GPa. A comparison of data for two non-oxide systems, $Al_2O_3$ and $TiO_2$, as a function of compaction pressure is shown in FIG. 9. The asymptotic limit in the green density appears to correlate with the hardness of the materials in which $Al_2O_3$ is greater than $TiO_2$, which is consistent with the concept that the higher packing density is due primarily to plastic deformation at the contact points between adjacent nanoparticles, accompanied by local particle rearrangements.

Figure 10:
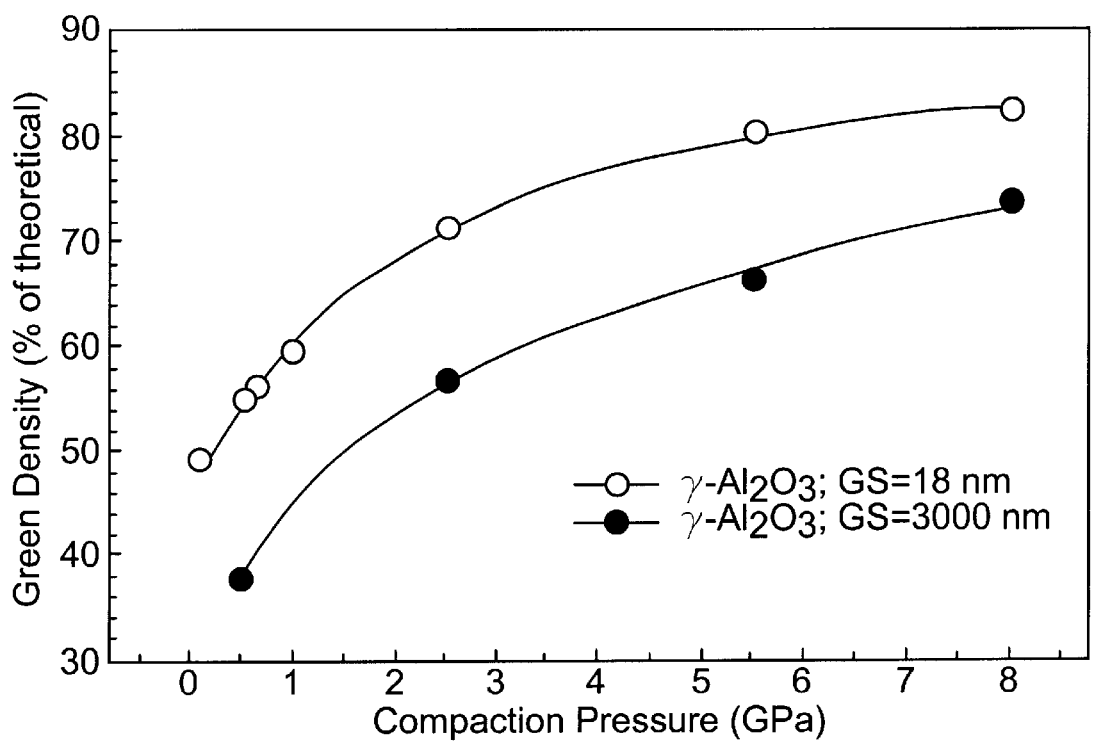
FIG. 10 is a graphical depiction of the green density of nano- and micron-alumina ($\gamma$) as a function of compaction pressure.

FIG. 10 shows the green density of nano and micro sized alumina ($\gamma$) as a function of compaction pressure. The maximum green density of the micro-scale material is about 74%, which is close to the theoretical packing density for close-packed spheres. In contrast, the maximum green density of the nano-scale material is higher at about 82%, which is surprising. Results on hot pressing of nano-$TiO_2$, nano-$Y_2O_3$, and nano-$Si_3N_4$ have shown effects similar to that described above for nano-$Al_2O_3$.

Figure 11A:
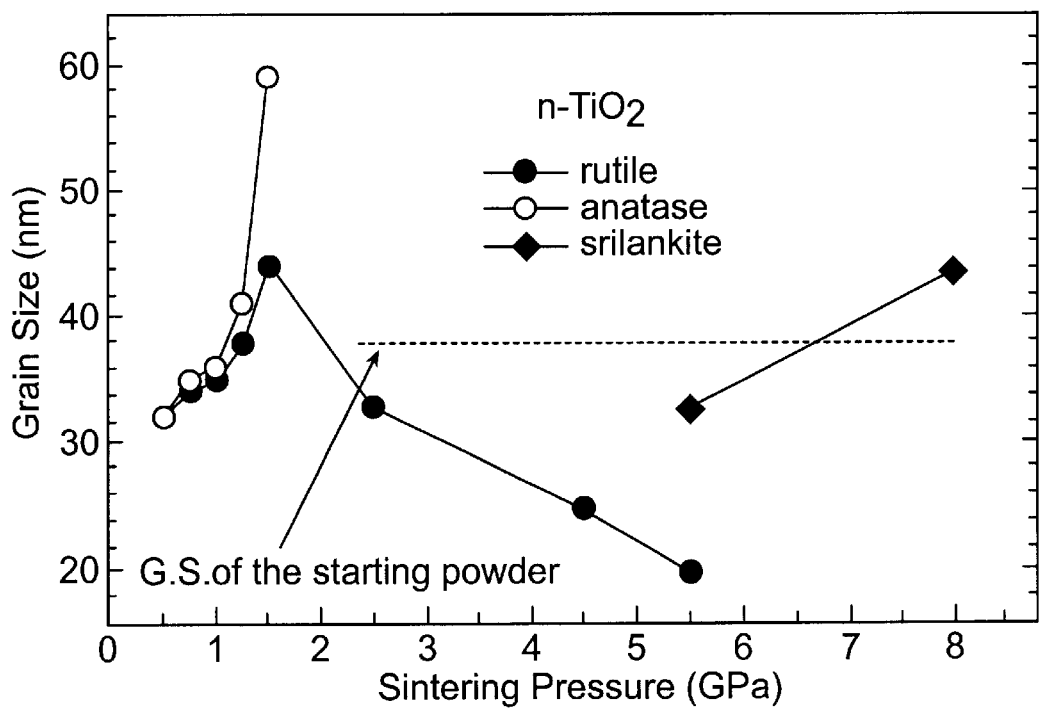
FIG. 11A is a graphical depiction of grain size of nano $TiO_2$ as a function of sintering pressure.
Figure 11B:
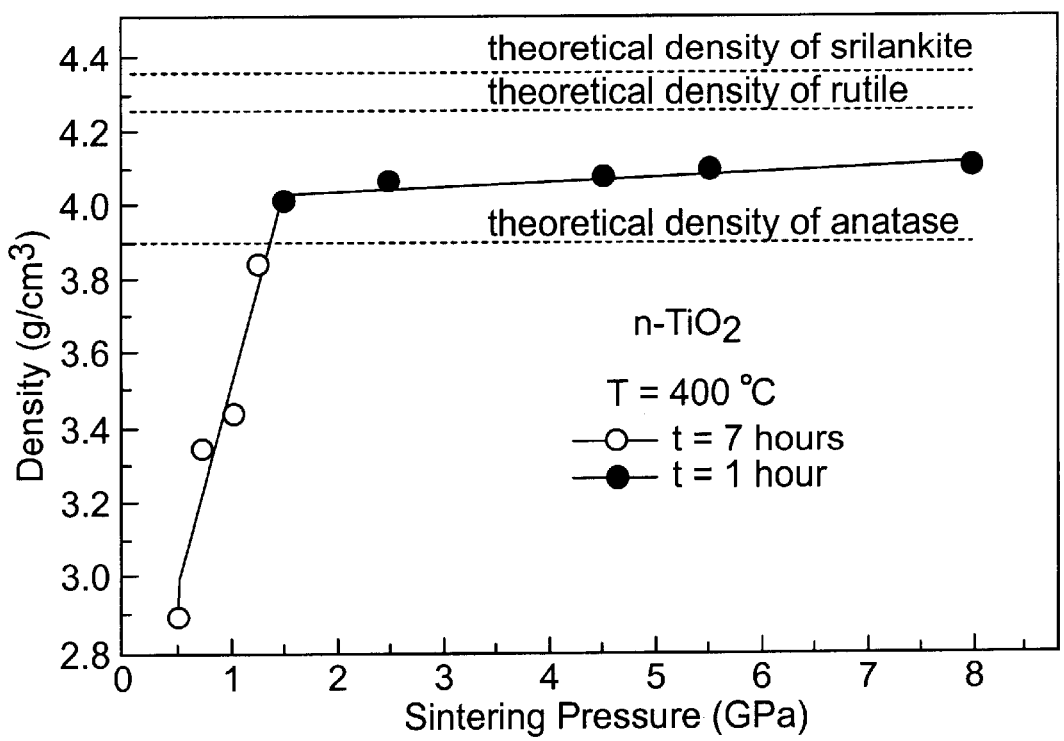
FIG. 11B is a graphical depiction of density of nano $TiO_2$ as a function of sintering pressure.

FIGS. 11A and 11B illustrate the effect of high pressure on grain size and density of nanocrystalline $TiO_2$. The grain size of the starting powder is represented by the dotted line. A pressure-induced phase transformation from metastable anatase to stable rutile occurs at 1.5 GPa at 400° C. With increasing pressure up to 5.5 GPa, the grain size of the fully dense material is progressively reduced. Accordingly, at 5.5 GPa the sintered grain size is 18 nm which is less than half of the original grain size of 38 nm.

Aspects of the present invention can be better understood by considering the following examples:

EXAMPLE 1

The green density of $\gamma$-$Al_2O_3$ powder compacts, with particle size about 18 nm, cold pressed at 8 GPa/25° C. was about 83% of theoretical density. The corresponding value for $\gamma$-$A_2O_3$ powder compacts, with particle size about 3 microns was about 74% of theoretical density.

EXAMPLE 2

The green density of $TiO_2$ (96% anatase+4% rutile) powder compacts, with grain size about 30 nm, cold pressed at 8 GPa/25° C. was 93% of theoretical density. It is noted that this is improved over the theoretical limit of 74% for closed packed spheres or 64% for randomly distributed spheres.

EXAMPLE 3

Hot pressing of $\gamma$-$Al_2O_3$ powder compacts (18 nm particle size) at 8 GPa/800° C. for 15 min. caused complete transformation to the $\alpha$-$Al_2O_3$ phase, and nearly complete densification while still retaining the desired nanocrystalline grain size. ($\rho$=3.92 g/cm$^3$; 98.2% dense; 49 nm grain size).

EXAMPLE 4

Hot pressing of nano-$TiO_2$ powder compacts (anatase phase; 30 nm particle size) at 3 GPa/400° C. for 60 min.

caused complete transformation to the rutile phase while retaining the desired nanocrystalline grain size. ($\rho$=4.08 g/cm$^3$; ~96% dense; 31 nm grain size).

EXAMPLE 5

Hot pressing of nano-TiO$_2$ powder compacts (anatase phase; 30 nm particle size) at 4 GPa/400° C. for 60 min. caused complete transformation to the rutile phase, and nearly complete densification to the nanocrystalline state ($\rho$=4.09 g/cm$^3$; about 96.2% dense; 27 nm grain size). Accordingly, the sintered grain size is smaller than the original powder particle size.

It should be understood that the above described embodiments are illustrative of only a few of the many possible specific embodiments, which can represent applications of the principles of the invention. Numerous and varied other arrangements can be devised by those skilled in the art without departing from the spirit and scope of the invention.

What is claimed is:

1. A method for fabricating a nanocrystalline ceramic article, the method comprising the steps of:
    synthesizing loosely-agglomerated ceramic nanopowder having a metastable structure;
    forming the ceramic nanopowder into a compact; and
    sintering the ceramic nanopowder compact under a pressure of 3 GPa to 5.5 GPa and at a temperature no greater than about 0.6 times the melting temperature of the ceramic nanopowder to form the nanocrystalline article, in which said metastable structure transforms into a stable structure with a smaller specific volume or a significant reduction in free volume of said metastable structure occurs, wherein a grain size of the nanocrystalline ceramic article is a nanoscale grain size which is smaller than a particle size of the ceramic nanopowder formed in the synthesizing step.

2. The method according to claim 1 wherein the synthesizing step is performed with a chemical vapor condensation (CVC) process that utilizes metalorganic precursors as feedstock materials.

3. The method according to claim 2 wherein the chemical vapor condensation process comprises a combustion-flame chemical vapor condensation (CVC) process and the ceramic nanopowder produced thereby is an oxide.

4. The method according to claim 2 wherein the CVC process comprises a hot-wall CVC process and the ceramic nanopowder produced thereby is a non-oxide.

5. The method according to claim 1 wherein the synthesizing step a chemical and physical synthesis process.

6. The method according to claim 1 wherein the synthesizing step is a process selected from the group consisting of laser pyrolysis, inert gas condensation, and plasma arc synthesis.

7. The method according to claim 1 wherein the ceramic nanopowder is nano-Al$_2$O$_3$ and the synthesizing step includes heating the nano-Al$_2$O$_3$ in a vacuum at less than 0.3 times the melting temperature of the nano-Al$_2$O$_3$ to eliminate chemisorbed surface species and to complete any incompleted precursor decomposition.

8. The method according to claim 1 wherein the ceramic nanopowder is nano-Si$_3$N$_4$ and the synthesizing step includes heating the nano-Si$_3$N$_4$ in a reactive gas stream of NH$_3$ at less than 0.3 times the melting temperature of the nano-Si$_3$N$_4$ to eliminate chemisorbed surface species and to complete any incompleted precursor decomposition.

9. The method according to claim 1 wherein the consolidating step includes applying a near-isostatic pressure to a practical working volume greater than 5 mm$^3$ using a press selected from the group consisting of toroidal presses, belt presses, tetrahedral presses, and piston and anvil presses.

10. The method according to claim 1 wherein the consolidating step is performed by surrounding the compact with a pressure transmitting medium.

11. The method according to claim 1 wherein the resulting ceramic article comprises a nanostructured ceramic having a density substantially near its fill theoretical density.

12. The method according to claim 1 wherein the ceramic nanopowder is selected from the group consisting of Al$_2$O$_3$, TiO$_2$, Y$_2$O$_3$, Si$_3$N, SiC, BaTiO$_3$, YBCO, AlN and their composites and the formed nanostructured ceramic article has a density substantially near its full theoretical density which provides exceptional hardness, toughness, and wear resistance.

* * * * *